US012162270B2

(12) United States Patent
Buthrath et al.

(10) Patent No.: US 12,162,270 B2
(45) Date of Patent: Dec. 10, 2024

(54) PRINTER, PRINTER CONTROL METHOD AND PROGRAM

(71) Applicant: SATO HOLDINGS KABUSHIKI KAISHA, Tokyo (JP)

(72) Inventors: Nuttawuth Buthrath, Tokyo (JP); Tomoki Takata, Saitama (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/425,806

(22) PCT Filed: Feb. 3, 2020

(86) PCT No.: PCT/JP2020/003998

§ 371 (c)(1), (2) Date: Jul. 26, 2021

(87) PCT Pub. No.: WO2020/195173

PCT Pub. Date: Oct. 1, 2020

(65) Prior Publication Data

US 2024/0123743 A1 Apr. 18, 2024

(30) Foreign Application Priority Data

Mar. 25, 2019 (JP) ................................ 2019-057435

(51) Int. Cl.

| | |
|---|---|
| ***B41J 3/407*** | (2006.01) |
| ***B41J 11/00*** | (2006.01) |
| ***B41J 11/46*** | (2006.01) |
| ***B65H 23/188*** | (2006.01) |

(52) U.S. Cl.

CPC ............. *B41J 11/46* (2013.01); *B41J 3/4075* (2013.01); *B41J 11/0095* (2013.01); *B65H 23/1884* (2013.01); *B65H 2701/192* (2013.01)

(58) Field of Classification Search

CPC ...... B41J 11/46; B41J 11/0095; B41J 3/4075; B41J 13/00; B41J 13/0009; B41J 15/00; B41J 15/046; B41J 15/04; B41J 15/044

See application file for complete search history.

(56) References Cited

U.S. PATENT DOCUMENTS

| | | | |
|---|---|---|---|
| 2017/0028749 | A1 | 2/2017 | Kanno |
| 2019/0023028 | A1 | 1/2019 | Kawaguti |

FOREIGN PATENT DOCUMENTS

| | | | |
|---|---|---|---|
| JP | 10-45297 | A | 2/1998 |
| JP | 2013-189284 | A | 9/2013 |
| JP | 2013-240893 | A | 12/2013 |
| JP | 2017-30922 | A | 2/2017 |
| JP | 2019-22958 | A | 2/2019 |

*Primary Examiner* — Kristal Feggins

(74) *Attorney, Agent, or Firm* — Foley & Lardner LLP

(57) ABSTRACT

The printer is a printer for printing on a label continuous body including a plurality of labels temporarily attached to a belt-like liner at predetermined intervals, the printer calculates the label pitch from the downstream end portion of a first label and the upstream end portion of the first label detected by a second detecting unit that detects an end portion of the label, if the calculated label pitch is smaller than a distance from a first detecting unit for identifying a printing start position of the label to a printing unit, the printer feeds the label continuous body to a printing start position of a second label based on the calculated label pitch.

6 Claims, 4 Drawing Sheets

PRINTER, PRINTER CONTROL METHOD AND PROGRAM

TECHNICAL FIELD

The present invention relates to a printer, a printer control method and a program.

BACKGROUND ART

In JP2013-189284A, it is disclosed that a printer for printing on a label continuous body to which a label piece is temporarily attached on a belt-like liner, wherein a detection sensor for reading a mark for detecting position pre-printed on the label continuous body is arranged upstream of a printing portion, and the printer aligns the label piece with the printing portion based on the mark for detecting position detected by the detection sensor and to print to the print piece.

In the above-mentioned printer, when a new label continuous body is set, the label continuous body is controlled to be fed downstream until the mark for detecting position is read by the detecting sensor. This enables the label continuous body to be fed and printed according to the interval of the label pieces of the newly set label continuous body.

SUMMARY OF INVENTION

However, in the above-mentioned printer, when the new label continuous body is set, the new label continuous body is fed until the mark for detecting position is detected by the detecting sensor in order to read a label pitch or the like of the new label continuous body.

In the printer described above, depending on the specification of the label continuous body, several labels may be sent out before the label on the label continuous body can be printed. For this reason, the labels located downstream side from the detection sensor of the label continuous body immediately after being set cannot be printed, and some labels are lost without being printed.

The present invention has an object to eliminate label loss in a printer that prints on a label continuous body including labels arranged at predetermined intervals on a belt-like liner.

According to one aspect of the present invention is to a printer for printing on a label continuous body including a plurality of labels temporarily attached to a belt-like liner at predetermined intervals, having: a feeding unit configured to feed the label continuous body in a feeding direction or in an opposite direction of the feeding direction; a printing unit configured to print the label; a first detecting unit configured to identify a printing start position of the label, the first detecting unit being disposed at upstream side of the printing unit in the feeding direction of the label continuous body; a second detecting unit configured to detect an end portion of the label, the second detecting unit being disposed at downstream side of the printing unit in the feeding direction; and a controller configured to control printing by the printing unit and feeding of the label continuous body, wherein the controller calculates a label pitch from a downstream end portion and an upstream end portion of a first label detected by the second detecting unit, and if the label pitch is smaller than a distance from the first detecting unit to the printing unit, feeds the label continuous body to a printing start position of a second label in the opposite direction of the feeding direction based on the label pitch.

With this aspect of the present invention, if the label pitch calculated from the downstream end portion of the first label and the upstream end portion of the first label detected by the second detecting unit is smaller than the distance from the first detecting unit to the printing unit, the second label is fed to the printing start portion of the second label based on the detected label pitch. Therefore, it is possible to print labels for which the printing start position of the label cannot be identified at the first detecting unit. Therefore, the label loss can be eliminated.

DESCRIPTION OF EMBODIMENTS

An embodiment of the present invention will be described below by referring to the attached drawings.

Figure 1:
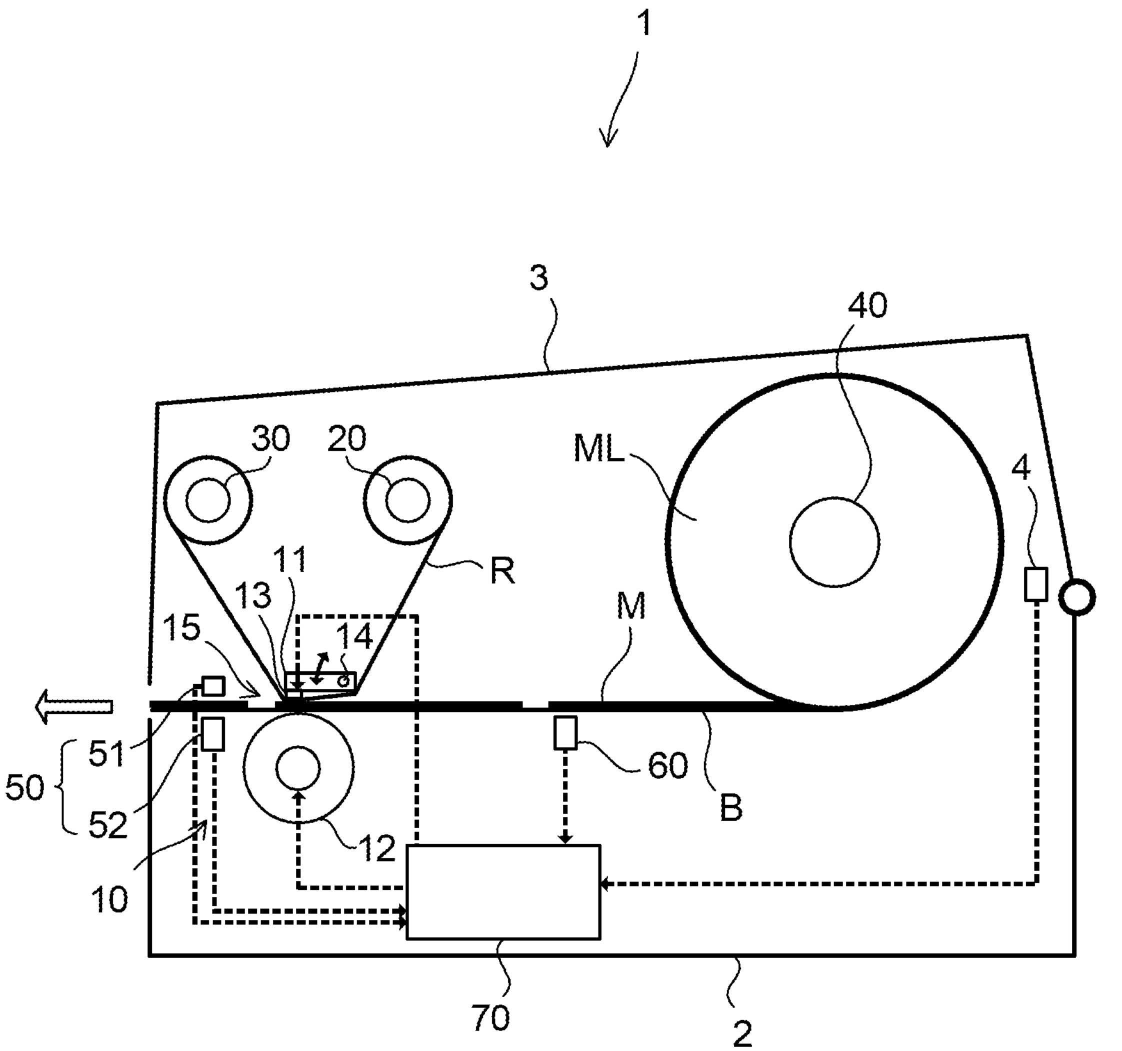
FIG. 1 illustrates a schematic configuration diagram of a printer according to an embodiment of the present invention.

FIG. 1 illustrates a schematic configuration diagram of a printer 1 according to the present embodiment.

The Printer 1 prints variable information such as prices, bar codes, other commodity information, and management information relating to articles or services on a print medium based on a medium issuing instruction, and is a thermal transfer printer that printing is performed by transferring ink of an ink ribbon R to the print medium by heating the ink ribbon R.

In the present embodiment, as the print medium, a plurality of labels M on a belt-like liner B are temporarily attached continuously at predetermined intervals, a label continuous body wound in a roll shape (hereinafter, referred to as continuous body ML) is applied. In the continuous body ML used in this embodiment, the label pitch L of each of the label M temporarily attached to the belt-like liner B is all the same. In other words, the label pitch L of the labels M that are temporarily attached to the liner B and the spacing between the labels M are all formed identically.

The printer 1, as illustrated in FIG. 1, includes a printing unit 10, a ribbon rewinding shaft 20, a ribbon winding shaft 30, a medium feeding shaft 40, a label detecting unit 50 for detecting a label M, a pitch detecting unit 60 for detecting a spacing (pitch) between labels M, and a controller 70 as a control unit.

Each of the above configurations is housed in a printer main body 2 and covered by a cover 3 which is openable and closable mounted with respect to the printer main body 2. Further, the cover 3 is provided with an opening/closing detecting sensor 4 for detecting the opening and closing of the cover 3. As the opening/closing detecting sensor 4, an optical sensor having a light-emitting portion and a light-receiving portion, or a physical sensor or the like is switched on and off if the cover 3 is opening and closing, can be applied.

The printing unit 10 comprises a head unit 11 and a platen roller 12, performs to print on the label M and to feed the continuous body ML and the ink ribbon R. That is, the printing unit 10 includes a configuration as a feeding unit in addition to a configuration as a printing unit.

The head unit 11 holds a thermal head 13 in a state of a heater element of the thermal head 13 exposed from a lower surface. The platen roller 12 is disposed just below the thermal head 13 and constitutes a printing portion 15 for printing to the label M together with the thermal head 13.

The head unit 11 is supported by supporting shaft 14, is swingable in the direction of the arrow illustrated in FIG. 1, by supporting shaft 14. The head unit 11 is movable into a head opening position where the thermal head 13 is spaced from the platen roller 12 and into a head closing position where the thermal head 13 abuts the platen roller 12. In FIG. 1, the head unit 11 is positioned at the head closing position.

The platen roller 12 is rotatably driven by a stepping motor which is not illustrated in the figure and is capable of driving to regular rotation or to reverse rotation according to an instruction signal from the controller 70.

The ribbon rewinding shaft 20 holds the ink ribbon R supplied to the printing portion 15 in a rolled form. The Ink ribbon R fed from the ribbon rewinding shaft 20 to the printing portion 15 is nipped between the thermal head 13 and the platen roller 12.

The medium feeding shaft 40 holds the continuous body ML supplied to the printing portion 15 in the rolled form. The continuous body ML fed from the medium feeding shaft 40 to the printing portion 15 is nipped with the ink ribbon R between the thermal head 13 and the platen roller 12.

The used ink ribbon R is wound around an outer circumference of the ribbon winding shaft 30 as the ribbon winding shaft 30 rotates due to the gear connection with the stepping motor. Incidentally, when the head unit 11 is in the head opening position, only the ink ribbon R can be fed in the winding direction by rotating the ribbon winding shaft 30.

In state that the label M and the ink ribbon R are nipped between the thermal head 13 and the platen roller 12, when a current provides to the heater element of the thermal head 13, heating of the heater element heat transfers the ink of the ink ribbon R to the label M, as a result, printing to the label M is performed. Further, when the platen roller 12 is rotated to regular rotation by stepping motor (not illustrated), the continuous body ML is fed to the downstream side (in the direction of the white arrow). In addition, to feeding the continuous body ML to the downstream side is referred to as "forward feeding", and to feeding the continuous body ML to upstream side is referred to as "back feeding".

The label detecting unit 50 as a second detention unit has a light-emitting portion 51 for emitting the detecting light and a light-receiving portion 52 for receiving the detecting light, and is constituting a transmission optical sensor. The label detecting unit 50 outputs an output voltage based on the detecting light received through the continuous body ML in the light-receiving portion 52 to the controller 70. In this embodiment, the label detecting unit 50 is disposed at downstream side of the printing unit 10.

The light-emitting portion 51 has multiple levels of a light emitting output of detecting light, for example, 128 levels in this embodiment, and the light emitting output can be adjusted according to the control by the controller 70.

The light-receiving portion 52 includes a plurality of stages of a receiving sensitivity for receiving the detecting light from the light-emitting portion 51, the receiving sensitivity is adjustable according to the control by the controller 70. The light-receiving portion 52 is disposed at a position facing the light-emitting portion 51.

The pitch detecting unit 60 as a first detecting unit includes a reflective sensor that detects an eye-mark (not illustrated in FIG. 1) that is preprinted at the same pitch as the arrangement pitch of label M on an opposite surface to the surface on which labels M is temporarily attached in the liner B. This allows a printing start position of the label M correspond to printing portion 15 to be identified when issuing the label M sequentially.

The controller 70 consists of a microprocessor, storage devices such as a ROM and a RAM, an input/output interfaces, and a bus for connecting these, and the like, which will be described later.

The controller 70 detects the downstream end portion Mf of the first label M and the upstream end portion Me of the first label M by the label detecting unit 50, and calculates the label pitch L using the detected downstream end portion Mf of the first label M and the upstream end portion Me of the first label M based on the control program.

Then, the controller 70 compares the calculated label pitch L with the distance D from the pitch detecting unit 60 to the printing unit 10, and when the calculated label pitch L is smaller than the distance D, the controller 70 feeds a second label M to the printing start position based on the calculated label pitch L.

In other words, as a functional configuration, controller 70 has a label pitch calculation unit that the calculates label pitch L from the downstream end portion Mf of the first label M detected by the label detecting unit 50 and the upstream end portion Me of the first label M, a comparison unit that compares the distance D between the pitch detecting unit 60 and the printing unit 10 with the label pitch L, and a control portion perform to feed the second label M to the printing start position based on the calculated label pitch L when the calculated label pitch L is smaller than the distance D.

If the label pitch L is larger than the distance D, the controller 70, based on the control program, feeds the second label to the printing start position of the second label M identified by the pitch detecting unit 60 when the second label M is printed.

Figure 2:
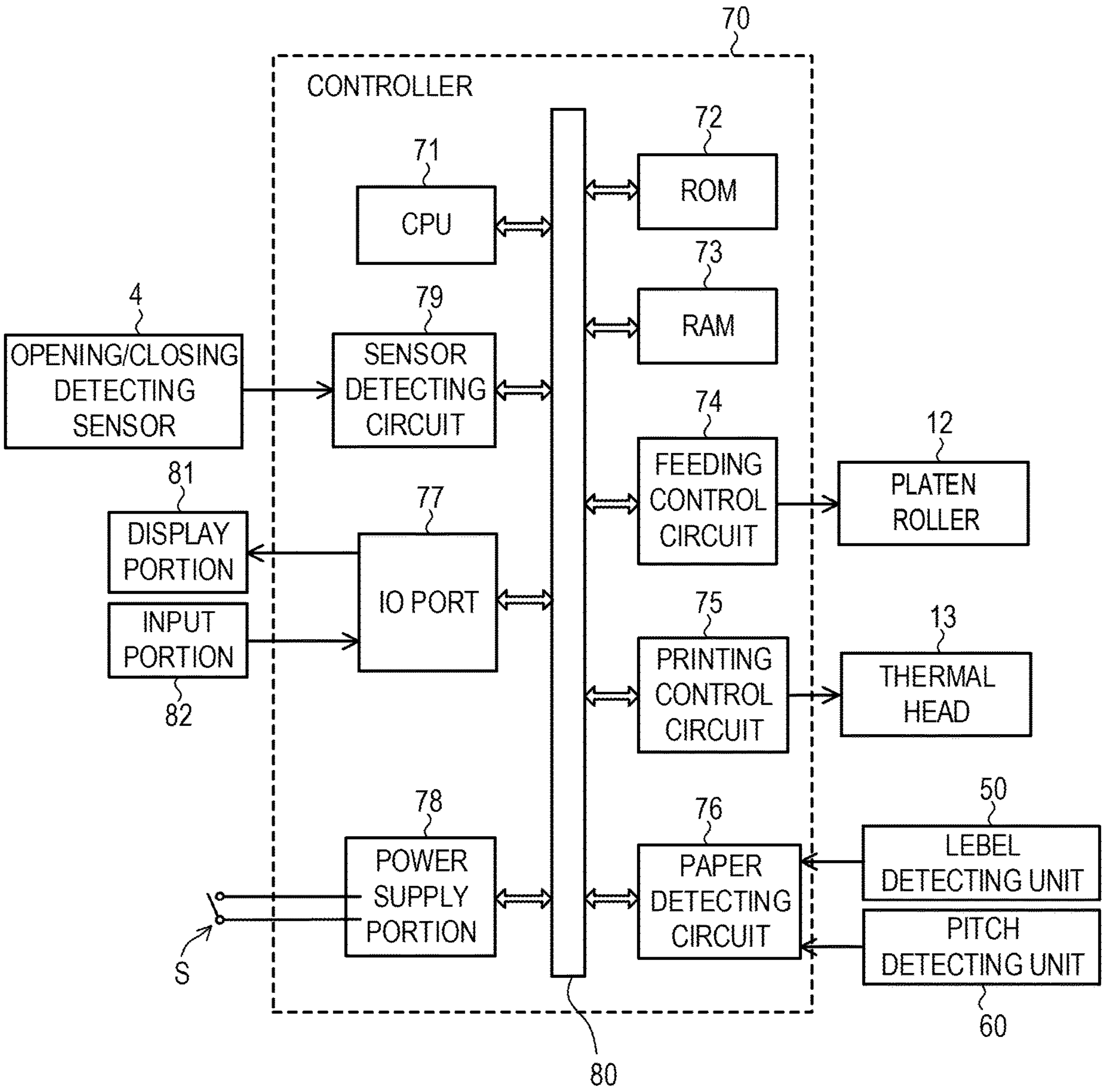
FIG. 2 illustrates a block diagram of the printer according to the present embodiment.

FIG. 2 illustrates a block diagram of the controller 70 according to the present embodiment.

The controller 70 is a computer including a CPU (central processing unit) 71, a ROM (read only memory) 72, a RAM (random access memory) 73, and the like, in addition to these, and further including a feeding control circuit 74, a printing control circuit 75, a paper detecting circuit 76, an IO port 77, a power supply portion 78, and a sensor detecting circuit 79. These are connected to each other via an internal bus 80, and these are equipped with a configuration that allows them to send and receive various data to each other.

The CPU 71 controls the entire controller 70 in a comprehensive manner by executing the above control program stored in the ROM 72, and also causes each part to perform the required processing and control.

The ROM 72 stores a control program or the like which is read and executed by the CPU 71. The ROM 72 stores a step for measuring the label pitch L from the downstream end portion Mf of the first label M and the upstream end portion Me of the first label detected by the label detecting unit 50, a step for comparing the distance D from the pitch detecting unit 60 to the printing unit 10 with the label pitch L, and a step for performing to feed the second label M to the printing start position based on the calculated label pitch L when the calculated label pitch L is smaller than the distance D.

The RAM 73 stores various information necessary for the processing executed by the CPU 71, a print data required for printing, a print format, and a registration information or the like.

The feeding control circuit 74 controls the stepping motor that drives the platen roller 12 according to the instruction signal from the CPU 71, and controls the rotation/stop of the platen roller 12. Thus, the platen roller 12 is controlled to drive the "forward feeding" or "back feeding" of the continuous body ML in the paper conveyance path. Also, Step count of regular rotation or reverse rotation of the stepping motor is configured to be counted.

The printing control circuit generates printing signals corresponding to the printing data such as characters, figures and barcodes to be printed supplied from the CPU 71, and supplies the generated printing signals to the thermal head 13. Thus, the printing is performed on the label M.

The paper detecting circuit 76 provides the CPU 71 with the information detected by the label detecting unit 50. Or, the paper detecting circuit 76 supplies the information obtained by the pitch detecting unit 60 to the CPU 71. The CPU 71 controls the feeding of the continuous body ML and the ink ribbon R by the feeding control circuit 74 based on the information from the paper detecting circuit 76, and also controls the timing of printing by the thermal head 13 to execute printing on the label M.

The IO port 77 is connected to the display portion 81 and the input portion 82, and outputs the display data supplied from the CPU 71 to the display portion 81. The IO port 77 also sends to the CPU 71 an operating signal corresponding to operation input by user through the input portion 82.

The display portion 81, for example, consists of a liquid crystal display. The input portion 82 consists of the touch panel, buttons, DIP-SW or the like, provided in the display portion 81.

The power supply portion 78 monitors the pressing operation on the power switch S and switches the power supply to the printer 1 ON/OFF by implementing and stopping the power supply to each portion based on the operation of the power switch S.

The sensor detecting circuit 79 supplies information on the opening/closing of the cover 3 from the opening/closing detecting sensor 4 to the CPU 71. The CPU 71 can start executing the process of adjusting the output voltage in the label detecting unit 50 upon receiving the information from the sensor detecting circuit 79 that it has shifted from "open" to "closed".

The controller 70 illustrated in FIG. 2 can also be composed of a plurality of CPUs. The controller 70 illustrated in FIG. 2 can also be composed of a plurality of CPUs.

Next, printing on the label M and feeding the continuous body ML in the printer 1 will be explained.

Figure 3:
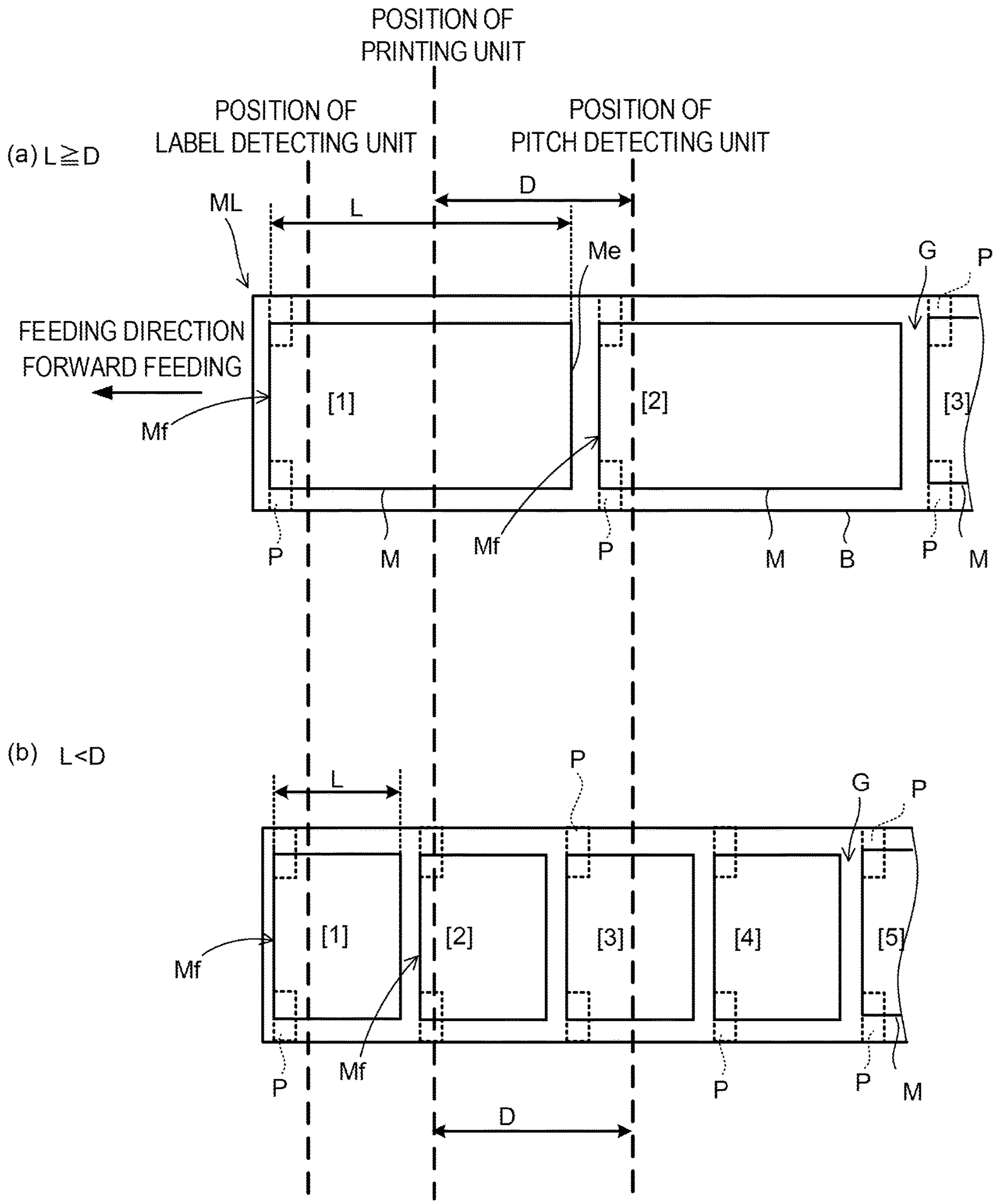
FIG. 3 illustrates a diagram of a continuous body, a position of a label detecting unit in the printer, and a position of a thermal head.

FIG. 3 illustrates a diagram of a continuous body ML, a position of a label detecting unit 50 in the printer 1, and a position of a thermal head 13. In FIG. 3, each label M is numbered consecutively ([1], [2], . . . ) to make it easier to understand the change in the position of each label M as the continuous body ML is fed.

As illustrated in FIG. 3(*a*), the continuous body ML consists of the belt-like liner B and a plurality of labels M temporarily attached to the liner B. On the back side of the liner B, an eye-mark P for pitch detection of the label M is pre-printed at a position corresponding to the tip of the label M downstream side of a feeding direction. In addition, each label M is arranged continuously in the feeding direction with a predetermined gap (gap G). The eye-mark can be used as an indicator to detect the pitch of each label M. The printed position of the eye-mark does not have to be the tip of the label M downstream side of the feeding direction.

The pitch detecting unit 60 can detect the position of the label M relative to the printing portion 15 by detecting the eye-mark P printed on the continuous body ML or the gap G. During printing on the given label M, the printer 1 can sequentially execute the operation that the printer 1 feed the continuous body ML until the printing start position of the label M reaches the position corresponding to the printing unit 10 according to the label pitch based on the eye-mark P detected by the pitch detecting unit 60 and start printing from the printing start position of the label M, sequentially.

However, as illustrated in FIG. 3(*b*), when the label pitch of the label M in the feeding direction is smaller than the distance D between the printing unit 10 and the pitch detecting unit 60, the eye-mark P corresponding to the third label M ([3] in FIG. 3(*b*)) may be detected by the pitch detecting unit 60. If the length of the label pitch L is shorter than the length of the label M, it is possible that the eye-mark P corresponding to the third or later label M has been read.

In such a case, when the printing of the first label is completed, the label M ([3] in FIG. 3(*b*)) corresponding to the eye-mark P detected during the printing of the first label M ([1] in FIG. 3(*b*)) is transported to the position of the printing unit 10. In this case, since the second label M cannot be printed, the second label M will be lost. If the length of the label pitch L is shorter than that shown in the figure, not only the second label M but also the labels after the second label M may be lost.

In contrast, the printer 1 calculates the label pitch L of the first label M while printing it, and if the calculated label pitch L is smaller than the distance D between the printing unit 10 and the pitch detecting unit 60, is configured to detect the upstream end portion Me of the first label M in the same way as when the downstream end portion Mf of the first label M is detected, instead of feeding the continuous body ML based on the eye-mark P detected by the pitch detecting unit 60.

Then, based on the downstream end portion Mf of the second label and the calculated label pitch L, the second label M is printed and the continuous body ML is fed.

Figure 4:
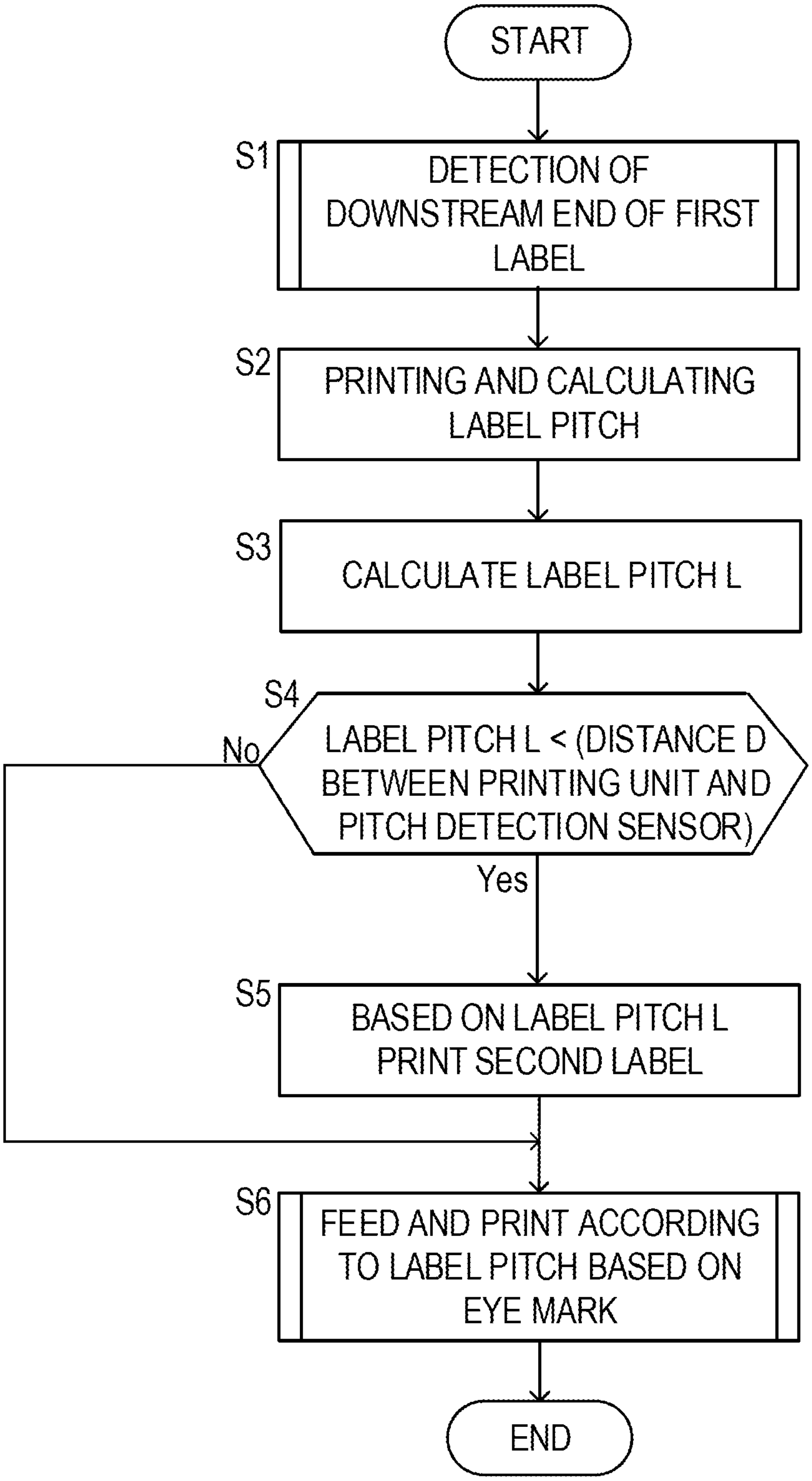
FIG. 4 illustrates a flowchart illustrating a first control of the label detecting unit according to the printer according to the present embodiment.

FIG. 4 illustrates a flowchart illustrating a control of the printing unit 10 and the label detecting unit 50 according to the printer 1. The operation of the printer 1 is described below with reference to FIG. 4.

When the controller 70 detects that the cover 3 is set to the closed position and the head unit 11 is set to the head closing position, the controller 70 starts executing the control process of the printing unit 10 and the label detecting unit 50 illustrated in FIG. 4.

In the printer 1, for example, as illustrated in FIG. 3(*a*), when it is detected that continuous body ML has been set by the user at a position where the rough position of the label M so as to correspond to the label detecting unit 50, the controller 70 detects the downstream end portion Mf of the first label M, at Step S1, by emitting the detecting light from the light-emitting portion 51 while performing the back feeding of the continuous body ML.

When the controller 70 detects the downstream end portion Mf of the first label M, at Step S2, the controller 70 performs the back feeding the first label M to the printing start position based on the downstream end portion Mf of the first label M, then starts printing, and calculates the label pitch. Specifically, the controller 70 performs the back feeding of the continuous body ML to the printing start position based on the predetermined printing data from the detected downstream end portion Mf of the first label M, and starts printing from the printing start position of the first label M.

Further, the controller 70 measures the change in the detected voltage based on the light-receiving portion 52 every time the platen roller 12 is fed forward for one step after the downstream end portion Mf of the first label M is detected, then detects the upstream end portion Me of the first label M. Then, the liner B is detected, and after that, when the downstream end portion Mf of the second label M is detected, the forward feeding is stopped.

The controller 70 calculates the label pitch L, at Step S3, based on the number of steps for the forward feeding at this time.

Then, at Step S4, the controller 70 compares the label pitch L calculated at Step S3 with the distance D between the printing unit 10 and the pitch detecting unit 60.

If it is determined at Step S4 that label pitch L is smaller than the distance D (Step S4, Yes), the controller 70 proceeds to Step S5. This corresponds to the pattern in FIG. 3(*b*).

At Step S5, the controller 70 feeds the second label M to the printing start position based on the detected downstream end portion Mf of the second label M and the calculated label pitch L, and executes printing.

In labels after the second label M, the controller 70 performs conveyance of the continuous body ML and printing on the label M based on the printing start position identified by the eye-mark P detected by the pitch detecting unit 60 at Step S6.

On the other hand, if it is determined at Step S4 that the calculated label pitch L is larger than or equal to the distance D (Step S4, No), the controller 70 proceeds to Step S6. This corresponds to the pattern in FIG. 3(*a*).

By executing the above process, the printer 1 of the present embodiment can also print on the label M whose the eye-mark P was not read by the pitch detecting unit 60.

[Effect]

According to the printer 1 of this embodiment, the label pitch L is calculated from the downstream end portion Mf of the first label M detected by the label detecting unit 50 and the upstream end portion Me of the first label M. The calculated label pitch L is compared with the distance D from the pitch detecting unit 60 to the printing unit 10. If the calculated label pitch L is smaller than the distance D, the printer 1 feeds the second label M to the printing start position based on the calculated label pitch L from the downstream end portion Mf of the second label M, and perform printing, instead of using the label pitch based on the eye-mark P detected by the pitch detecting unit 60.

As a result, the printer 1 can identify the printing start position of the label M whose the eye-mark P could not be detected by the pitch detecting unit 60, and start printing. Furthermore, the feeding amount until the printing start position of the next label M can be determined, and printing can be performed for the label M for which the eye-mark P could not be detected by the pitch detecting unit 60.

Therefore, some labels in the continuous body ML will not be sent out without being printed, and label loss can be eliminated.

[A Control Method of the Printer]

The control method of the printer according to the present invention calculates the label pitch L from the downstream end portion Mf and the upstream end portion Me of the first label M detected by the label detecting unit 50 as the second detecting unit, and if the calculated label pitch L is smaller than the distance from the pitch detecting unit 60 as the first detecting unit to the printing unit 10, perform to feed the continuous body ML to opposite direction of the feeding direction to the printing start position of the second label M, based on the calculated label pitch L. This control method of the printer is achieved by the printer 1 described above.

Other Embodiments

Although the embodiments of the present invention have been described in the above, the above-mentioned embodiments merely illustrate a part of application examples of the present invention, and the technical scope of the present invention is not intended to be limited to the specific constitutions of the above-described embodiments.

In the present embodiment, the case where the second label M cannot be printed was explained. Moreover, if the label pitch L is smaller than the one described, a case can occur in which two or more labels M are placed at the distance D between the printing unit 10 and the pitch detecting unit 60 detected by the pitch detecting unit 60. Even in such a case, in the printer according to the present embodiment, printing can be performed without loss in the same way.

In the present embodiment, it described that the ink ribbon transfer printer 1 using the thermal head 13, but it can also be a thermal transfer printer using thermal transfer, where the label M is thermal paper and the printer 1 prints on the label M by applying heat to the thermal head 13.

The flowchart illustrated in FIG. 4 is a process that assumes that the label M is set to the position corresponding to the label detecting unit 50, as illustrated in FIG. 3(*a*).

In contrast, the controller 70 can also detect the end portion Mf by forward feeding from the state that the gap G between labels M set to the position corresponding to the label detecting unit 50 when the head unit 11 is set to the head closing position.

In actual continuous body ML, the gap G between labels M is often set to be significantly shorter than the length of each label M in the feeding direction. Therefore, it is simpler for the user to align the label M to the position corresponding to the label detecting unit 50.

This application claims priority based on Japanese Patent Application No. 2019-057435 filed with the Japan Patent Office on Mar. 25, 2019 the entire contents of which are incorporated into this specification by reference.

The invention claimed is:

1. A printer for printing on a label continuous body including a plurality of labels temporarily attached to a belt-like liner at predetermined intervals, the printer comprising:

- a feeding unit configured to feed the label continuous body in a feeding direction or in an opposite direction of the feeding direction;
- a printing unit configured to print on the labels;
- a first detecting unit disposed at an upstream side of the printing unit in the feeding direction;
- a second detecting unit disposed at a downstream side of the printing unit in the feeding direction; and
- a controller configured to control printing by the printing unit and feeding of the label continuous body, the controller configured to:
  - control the second detecting unit to detect a downstream end of a first downstream side label,
  - control the feeding unit, based on the detected downstream end of the first downstream side label, to feed the label continuous body in the opposite direction of the feeding direction to a position where a printing start position of the first downstream side label corresponds to a position of the printing unit,
  - operate the printing unit to print on the first downstream side label while the feeding unit feeds the label continuous body in the feeding direction, control the second detecting unit to detect a downstream end of a second downstream side label that is upstream of the first downstream side label, control the feeding unit, based on the detected downstream end of the second downstream side label, to feed the label continuous body in the opposite direction of the feeding direction to a position where a printing start position of the second downstream side label corresponds to the position of the printing unit, operate the printing unit to print on the second downstream side label while the feeding unit feeds the label continuous body in the feeding direction, control the first detecting unit to detect a mark corresponding to a first upstream side label that is upstream of the second downstream side label, wherein the mark is for detecting positions of the labels or a gap between the labels, operate the feeding unit, based on the detected mark, to feed the label continuous body in the feeding direction to a position where a printing start position of the first upstream side label corresponds to the position of the printing unit, and operate the printing unit to print on the first upstream side label.

2. The printer according to claim 1, wherein the controller is configured to, responsive to the label continuous body being set in the printer, control the feeding unit to feed the label continuous body in the opposite direction of the feeding direction until the second detecting body detects the downstream end of the first downstream side label.

3. The printer according to claim 1, wherein:

the printing unit further comprises:

a head unit holding a thermal head; and a platen roller, wherein the printing unit is configured to receive the label continuous body between the thermal head and the platen roller;

the head unit is movable between a head opening position in which the thermal head is separated from the platen roller and a head closing position in which the thermal head abuts the platen roller;

the controller is configured to, responsive to the second detecting unit detecting one of the labels and the head unit being in the head closing position, control the feeding unit to feed the label continuous body in the opposite direction of the feeding direction; and the controller is configured to, responsive to the second detecting unit not detecting one of the labels, operate the feeding unit to feed the label continuous body in the feeding direction.

4. The printer according to claim 3, wherein the controller is configured to, responsive to the label continuous body being set in the printer, control the feeding unit to feed the label continuous body in the opposite direction of the feeding direction until the second detecting body detects the downstream end of the first downstream side label.

5. A control method for a printer configured to print on a label continuous body including a plurality of labels temporarily attached to a belt-like liner at predetermined intervals, the printer comprising:

a feeding unit configured to feed the label continuous body in a feeding direction or in an opposite direction of the feeding direction, a printing unit configured to print on the labels, a first detecting unit being disposed at an upstream side of the printing unit in the feeding direction, and a second detecting unit disposed at a downstream side of the printing unit in the feeding direction, wherein the control method comprises:

operating the feeding unit to feed the label continuous body;

detecting, by the second detecting unit, a downstream end of a first downstream side label;

controlling the second detecting unit to detect a downstream end of a first downstream side label, controlling the feeding unit, based on the detected downstream end of the first downstream side label, to feed the label continuous body in the opposite direction of the feeding direction to a position where a printing start position of the first downstream side label corresponds to a position of the printing unit, operating the printing unit to print on the first downstream side label while the feeding unit feeds the label continuous body in the feeding direction, controlling the second detecting unit to detect a downstream end of a second downstream side label that is upstream of the first downstream side label, controlling the feeding unit, based on the detected downstream end of the second downstream side label, to feed the label continuous body in the opposite direction of the feeding direction to a position where a printing start position of the second downstream side label corresponds to the position of the printing unit, operating the printing unit to print on the second downstream side label while the feeding unit feeds the label continuous body in the feeding direction, controlling the first detecting unit to detect a mark corresponding to a first upstream side label that is upstream of the second downstream side label, wherein the mark is for detecting positions of the labels or a gap between the labels, operating the feeding unit, based on the detected mark, to feed the label continuous body in the feeding direction to a position where a printing start position of the first upstream side label corresponds to the position of the printing unit, and operating the printing unit to print on the first upstream side label.

6. A computer-readable storage medium storing a program for causing a computer installed in a printer configured to print on a label continuous body including a plurality of labels temporarily attached to a belt-like liner at predetermined intervals, to execute a process, the printer comprising:

a feeding unit configured to feed the label continuous body in a feeding direction or in an opposite direction of the feeding direction, a printer unit configured to print on the labels;

a first detecting unit disposed at an upstream side of the printing unit in the feeding direction of the label continuous body, and a second detecting unit disposed at a downstream side of the printing unit in the feeding direction, wherein the process comprises:

operating the feeding unit to feed the label continuous body;

detecting, by the second detecting unit, a downstream end of a first downstream side label;

controlling the second detecting unit to detect a downstream end of a first downstream side label, controlling the feeding unit, based on the detected downstream end of the first downstream side label, to feed the label continuous body in the opposite direction of the feeding direction to a position where a printing start position of the first downstream side label corresponds to a position of the printing unit, operating the printing unit to print on the first downstream side label while the feeding unit feeds the label continuous body in the feeding direction, controlling the second detecting unit to detect a downstream end of a second downstream side label that is upstream of the first downstream side label, controlling the feeding unit, based on the detected downstream end of the second downstream side label, to feed the label continuous body in the opposite direction of the feeding direction to a position where a printing start position of the second downstream side label corresponds to the position of the printing unit, operating the printing unit to print on the second downstream side label while the feeding unit feeds the label continuous body in the feeding direction, controlling the first detecting unit to detect a mark corresponding to a first upstream side label that is upstream of the second downstream side label, wherein the mark is for detecting positions of the labels or a gap between the labels, operating the feeding unit, based on the detected mark, to feed the label continuous body in the feeding direction to a position where a printing start position of the first upstream side label corresponds to the position of the printing unit, and operating the printing unit to print on the first upstream side label.

* * * * *